(12) United States Patent
Hanna et al.

(10) Patent No.: US 8,820,491 B2
(45) Date of Patent: Sep. 2, 2014

(54) BI-METAL DISC BRAKE ROTOR AND METHOD OF MANUFACTURING

(75) Inventors: Michael D. Hanna, West Bloomfield, MI (US); James G. Schroth, Troy, MI (US); Richard H. Hammar, Utica, MI (US); Omar S. Dessouki, Beverly Hills, MI (US); Brent D. Lowe, Milford, MI (US); Mark T. Riefe, Brighton, MI (US); Jeremy W. Short, Berkley, MI (US); Andrew Schertzer, St. Catharines (CA)

(73) Assignee: GM Global Technology Operations LLC, Detroit, MI (US)

( * ) Notice: Subject to any disclaimer, the term of this patent is extended or adjusted under 35 U.S.C. 154(b) by 577 days.

(21) Appl. No.: 13/094,396

(22) Filed: Apr. 26, 2011

(65) Prior Publication Data

US 2011/0198169 A1 Aug. 18, 2011

Related U.S. Application Data

(62) Division of application No. 11/475,756, filed on Jun. 27, 2006, now Pat. No. 7,937,819.

(60) Provisional application No. 60/718,579, filed on Sep. 19, 2005.

(51) Int. Cl.
    *F16D 65/10* (2006.01)
(52) U.S. Cl.
    USPC .................................... 188/218 XL

(58) Field of Classification Search
    USPC ...... 188/218 A, 218 R, 218 XL; 29/458, 460, 29/527.2; 164/98, 100, 112
    See application file for complete search history.

(56) References Cited

U.S. PATENT DOCUMENTS

| | | | |
|---|---|---|---|
| 4,808,275 A * | 2/1989 | Ohzora et al. | 205/109 |
| 5,004,078 A * | 4/1991 | Oono et al. | 188/218 A |
| 5,224,572 A * | 7/1993 | Smolen et al. | 188/218 XL |
| 5,273,140 A * | 12/1993 | Berwanger | 188/73.1 |
| 5,620,042 A * | 4/1997 | Ihm | 164/95 |
| 6,241,055 B1 * | 6/2001 | Daudi | 188/73.35 |
| 6,357,557 B1 * | 3/2002 | Di Ponio | 188/18 A |
| 7,600,614 B2 * | 10/2009 | Doppling et al. | 188/218 XL |
| 7,775,332 B2 * | 8/2010 | Hanna et al. | 188/218 XL |
| 7,937,819 B2 * | 5/2011 | Hanna et al. | 29/458 |
| 8,245,758 B2 * | 8/2012 | Hanna et al. | 164/98 |
| 2005/0183909 A1 * | 8/2005 | Rau et al. | 188/218 XL |

* cited by examiner

*Primary Examiner* — Christopher Schwartz
(74) *Attorney, Agent, or Firm* — BrooksGroup

(57) ABSTRACT

The invention provides a method for manufacturing a friction damped disc brake rotor, including the steps of: (A) providing a ceramic coating on an insert, wherein the insert has a body with tabs extending therefrom to hold the insert in a desired position within a mold; (B) washing the ceramic coating off of the tabs; (C) positioning the insert into the mold; and (D) casting a rotor cheek of the disc brake rotor in the mold around the insert such that a portion of each tab is bonded with the rotor cheek, and such that the coating is substantially non-bonded with the rotor cheek so that the coating provides a proper interfacial boundary between the body and the cheek for damping, and the at least partial bonding of each tab with the rotor cheek prevents corrosion-causing exterior elements from reaching the interfacial boundary when the friction damped disc brake rotor is in use.

13 Claims, 3 Drawing Sheets

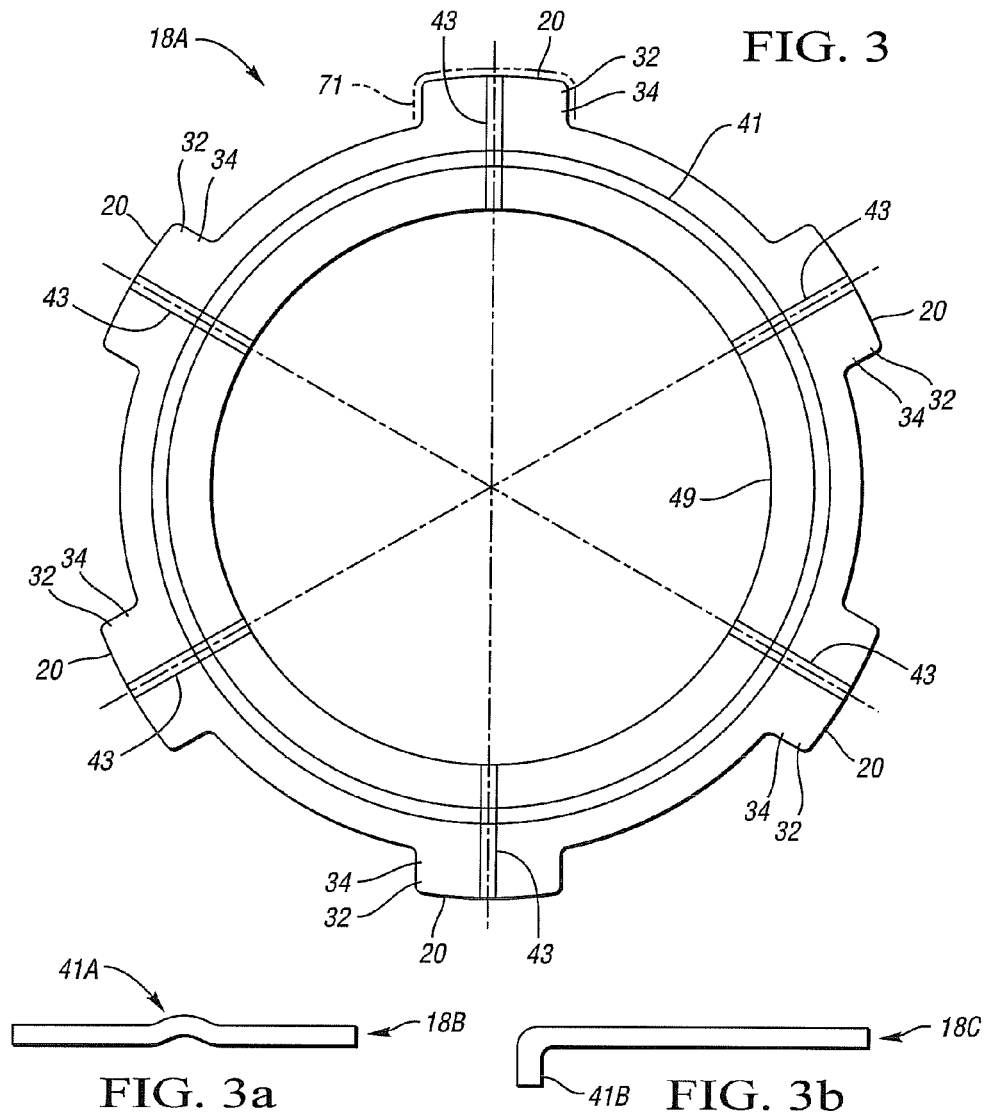
FIG. 3
FIG. 3a
FIG. 3b
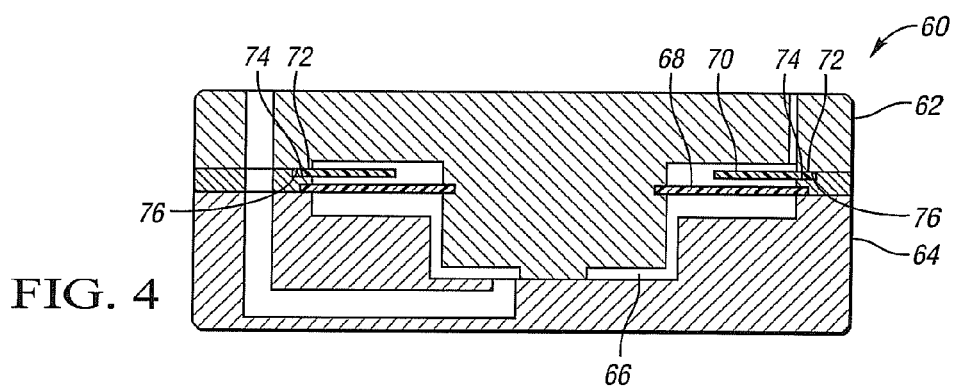
FIG. 4

BI-METAL DISC BRAKE ROTOR AND METHOD OF MANUFACTURING

CROSS-REFERENCE TO RELATED APPLICATION

This application is a divisional of U.S. application Ser. No. 11/475,756 filed Jun. 27, 2006, which claims the benefit of U.S. Provisional Application Ser. No. 60/718,579 filed Sep. 19, 2005.

TECHNICAL FIELD

The present invention relates to a hi-metal disc brake rotor and a method of manufacturing bi-metal brake disc rotors in which an insert is cast into the brake rotor in a manner to provide improved noise damping without subjecting the rotor to corrosion.

BACKGROUND OF THE INVENTION

Motor vehicle disc brake systems utilize a disc brake rotor at each respective wheel, wherein the disc brake rotor typically includes a rotor hat for connecting to an axle hub of a rotatable axle of the motor vehicle, and at least one annular rotor cheek connected to the rotor hat, wherein the at least one rotor cheek has a pair of mutually opposed braking surfaces onto which brake pads are selectively applied when braking is desired. Typically, the rotor cheek configuration may be solid, in which case a single rotor cheek has opposing braking surfaces thereon, or may be vented, in which case a pair of rotor cheeks are mutually separated by a web of ventilation vanes and each rotor cheek provides a respective braking surface so that, in combination, two mutually opposed braking surfaces are provided.

The disc brake system further typically includes a caliper which supports a mutually opposed pair of brake pads, one brake pad disposed overlying a respective rotor cheek braking surface, wherein the caliper, the brake pads, and other associated brake components collectively form a "brake corner". Normally, the caliper keeps the brake pads separated from the braking surfaces of the one or more rotor cheeks. Braking of the motor vehicle occurs at the brake corner by the caliper pressing the brake pads upon the braking surfaces of the one or more rotor cheeks. Frictional interaction between the one or more rotating rotor cheeks and non-rotating brake pads causes braking of the motor vehicle to transpire, the rate of braking depending upon the pressure of the brake pads against the braking surfaces.

Brake squeal can be undesirably generated at the brake corner when braking occurs. This brake squeal is the result of modal excitations of the disc brake rotor (composed usually of cast iron) by the frictional material of the brake pads. It is known in the prior art that brake squeal can be addressed by reducing modal excitation on the disc brake rotor by the friction material of the brake pads (i.e., lowering the frictional coefficient), by modifying the modal excitation response of the brake corner via changing the modal properties of the rotor cheeks (i.e., in terms of resonant frequencies, mode shapes, and structural damping through higher carbon content of the one or more rotor cheeks and/or increasing the disc brake rotor mass, or using exotic, expensive materials), and by introducing additional damping for example via a shim disposed at a backing plate of the brake pads.

The aforementioned brake squeal countermeasures are relatively effective for most brake corner designs, but they require a significant amount of testing and analytical resources in order to be effective. And unfortunately, brake corners for performance motor vehicles, or those motor vehicles with high friction lining materials, are resistant to the prior art brake squeal countermeasures, due to the high amount of modal excitation from the friction material of the brake pads.

U.S. patent application Ser. No. 10/961,813, filed Oct. 8, 2004, commonly assigned with the present application, and hereby incorporated by reference in its entirety, teaches Coulomb friction damped disc brake rotor configurations having an insert within the rotor to provide improved damping.

SUMMARY OF THE INVENTION

The invention provides a method for manufacturing a friction damped disc brake rotor, including the steps of: (A) providing a ceramic coating or other suitable coating on an insert, wherein the insert has a body with tabs extending therefrom to hold the insert in a desired position within a mold; (B) washing the ceramic coating off of the tabs; (C) positioning the insert into the mold; and (D) casting a rotor cheek of the disc brake rotor in the mold around the insert such that a portion of each tab is bonded with the rotor cheek, and such that the coating is substantially non-bonded with the rotor cheek so that the coating provides a proper interfacial boundary between the body and the cheek for damping, and the at least partial bonding of each tab with the rotor cheek prevents corrosion-causing exterior elements from reaching the interfacial boundary when the friction damped disc brake rotor is in use.

The tabs may be internal to the annular body (i.e. extending from the internal diameter), external to the body (i.e. extending from the outer diameter), or both internal and external to the body. The insert is preferably steel and the casting material is cast iron. The ceramic coating is preferably a mold wash material having alumina and silica particles mixed with an organic binder. Also, the insert is sandblasted prior to application of the coating. The coating is sprayed onto the insert, and the insert is heated at approximately 500 degrees F. for at least approximately 1 hour prior to being positioned in the mold. The coating is locally removed from the tabs after the insert has been heated. The ceramic coating is between approximately 50 and 300 micrometers thick, and the insert is between approximately 1.5 and 2.0 mm thick.

Alternatively, rather than applying the coating to both the body and the tabs and then washing the coating off the tabs, the tabs could be covered (screened) while the coating is applied only to the body. Also, a graphite coating could be applied to the tabs to enhance bonding.

The insert may be provided with stiffening ribs extending radially or annularly. Alternatively, the insert may include a turned down flange along the internal diameter of the annular insert body, and/or may include through holes to facilitate mold filling by preventing lifting of the insert during mold filling.

These and other features and advantages of the present invention will become clearer from the following specification of a preferred embodiment.

BRIEF DESCRIPTION OF THE DRAWINGS

FIG. 1b shows an enlarged view of area 1b identified in FIG. 1a;

FIG. 3 is a plan view of an insert in accordance with an alternative embodiment of the invention;

FIG. 3a is a schematic partial cross-sectional view of an insert having an alternative stiffening bump;

FIG. 3b is a schematic partial cross-sectional view of an insert having an alternative stiffening downturned flange;

FIG. 4 is a schematic side sectional view of an insert positioned within a mold for casting a friction damped disc brake rotor having a vented rotor cheek, with the mold in the closed position for casting.

DESCRIPTION OF THE PREFERRED EMBODIMENTS

Figure 1A:
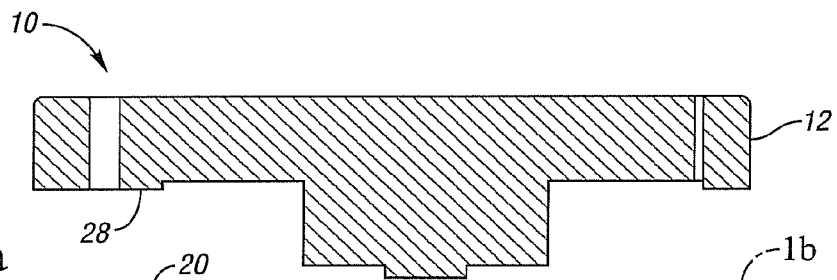
FIG. 1a is a schematic side sectional view of an insert positioned within a casting mold in accordance with the present invention.
Figure 1B:
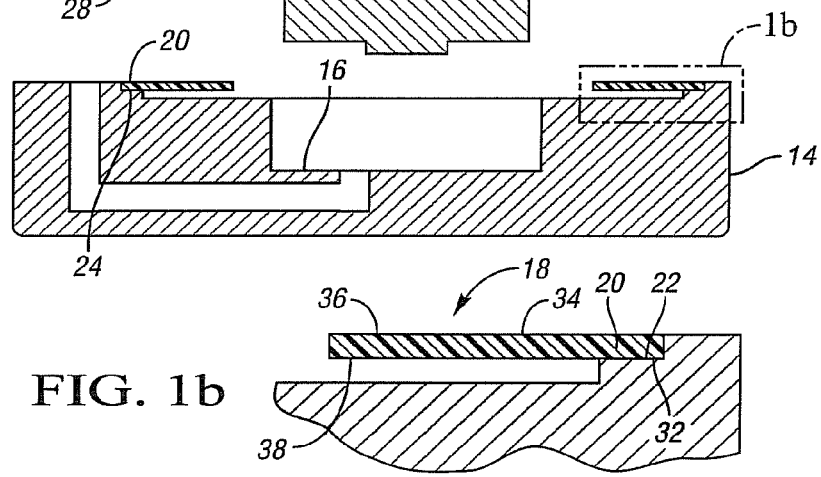
Figure 1C:
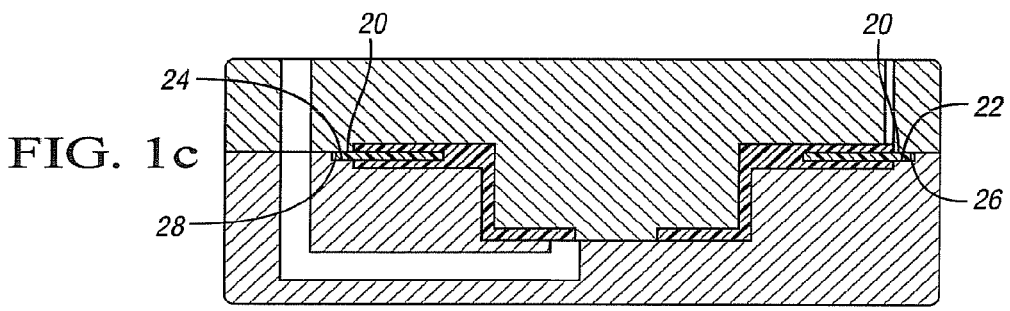
FIG. 1c is a schematic side sectional view of the mold and insert of FIG. 1a, with the mold closed and molten iron introduced into the mold to form a friction damped disc brake rotor in accordance with the invention.

Referring to FIG. 1a, a mold 10 is accordance with the invention having upper and lower mold halves 12, 14 which form a cavity 16 therebetween for casting a friction damped disk brake rotor in accordance with the invention. FIG. 1b shows an insert 18 which is pre-positioned within the mold 10 and having tabs 20 which rest on cutout portions 22, 24 of the lower mold half 14. As shown in FIG. 1c, when the upper and lower mold halves 12, 14 are closed together, the tabs 20 are supported between the cutout portions 22, 24 of the lower mold half 14 and the lands 26, 28, respectively of the upper mold half 12.

Figure 2:
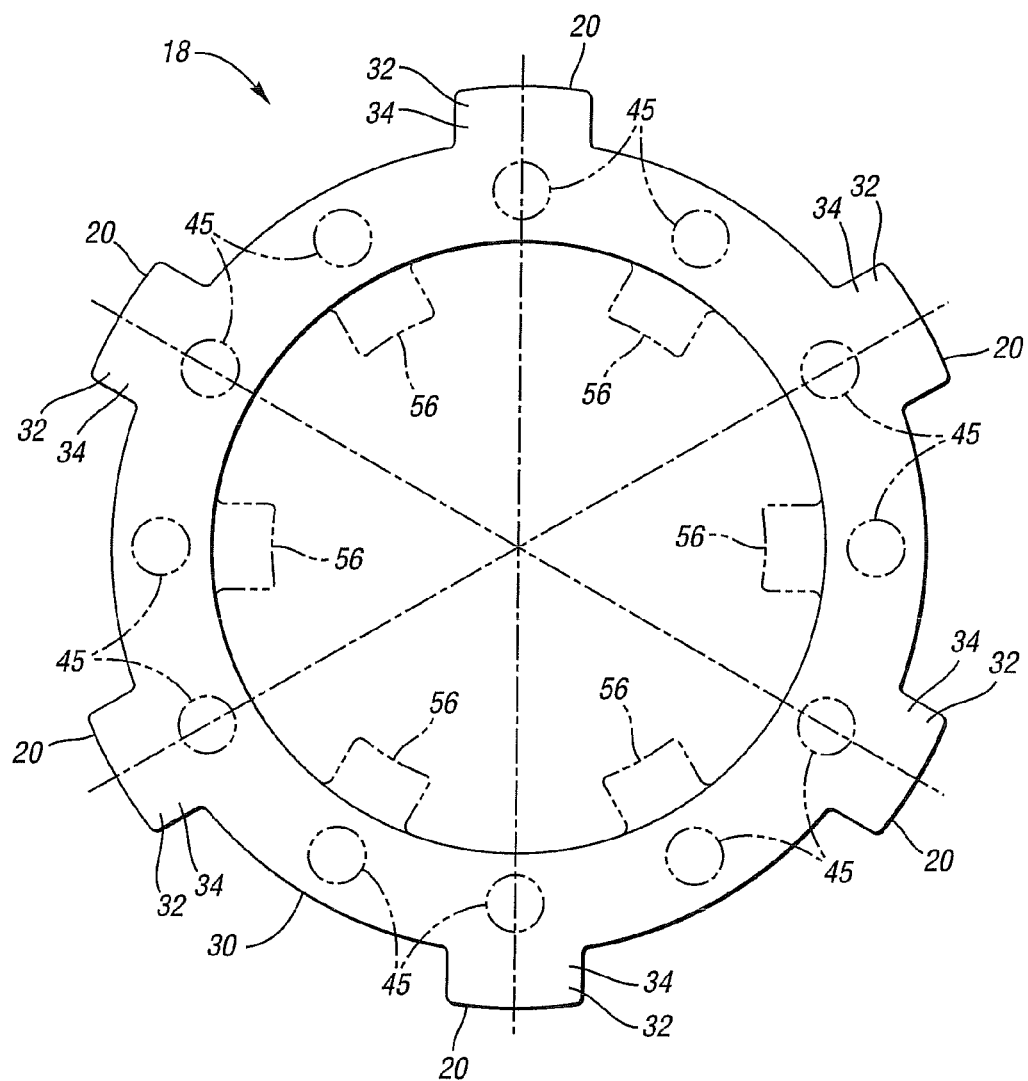
FIG. 2 is a plan view of the insert shown in FIGS. 1a-d, with alternative configurations shown in phantom.

Referring to FIG. 2, the insert 18 is shown in plan view. As shown, the insert 18 has a generally annular body 30 with tabs 20 extending therefrom. Each tab includes a distal portion 32 and a proximal portion 34. The distal portion 32 is trapped between the cutout portions 22, 24 and the lands 26, 28, respectively, shown in FIG. 1c, while the proximal portion 34 of each tab 20 is exposed to molten metal within the mold cavity 16.

The mold 10 is preferably a sand mold, and the insert 18 is a pre-manufactured steel component having a coating on opposing surfaces 36, 38 (shown in FIG. 1b) around the entire body 30. These coated surfaces 36, 38 do not bond with the cast metal in the casting operation. The lack of "wetting" or affinity along these coated surfaces 36, 38 produces the desired interfacial boundary for damping. However, the tabs 20, particularly the proximal portion 34 of each tab 20, is configured in a manner to bond with the cast metal of the rotor cheek. Since the coated surfaces 36, 38 of the insert 18 do not bond with the cast metal of the rotor cheek, a proper interfacial boundary is formed with the cheek for damping. However, the bonding of the tabs, particularly the proximal portions 34 thereof, with the cast metal of the rotor cheek prevents corrosion causing exterior elements from reaching the interfacial boundary between the coated surfaces 36, 38 and the cast metal rotor cheek. This bonding may be achieved by first coating the tabs 20 with the same material which forms the coated surfaces 36, 38 of the body 30 and then cleaning the coating off the tabs 20 to locally remove the coating to allow the tabs to be micro-welded to the cast iron to effectively seal the rest of the insert/iron interface from intrusion by water or other elements from the exterior of the casting. Alternatively, rather than applying a coating across the entire insert and then locally cleaning the tabs, a graphite coating may be applied to the tabs 20 to enhance bonding with the cast metal. So called "wetting" of the tab edges can also be accomplished by masking the tab prior to application of the coating. The insert may comprise any material having a melting point higher than that of cast iron that would not be dissolved during the casting process.

The above-referenced coated surfaces 36, 38 must first be cleaned free of oil, rust or dirt. Degreasers may be used to remove thin films of oil, and steel wool may be used to remove rust. The best results are attained when the steel insert is sand blasted, which removes both oil and rust. It also roughens up the surface which helps the coating adhere better.

The preferred coating material is a ceramic mold wash material sold under the trade name IronKote, and is available from Vesuvius Canada Refractories, Inc. of Welland, Ontario. IronKote has alumina and silica particles mixed with an organic binder. It is approximately 47.5% alumina and 39.8% silica with a lignisole (lignosulfanate) binder. The coating preferably has a thickness between approximately 50 and 300 micrometers. Other ceramic coatings having a melting point higher than cast iron may be used.

Once the insert is cleaned and free of oil and rust, it is dipped in or sprayed with IronKote on both sides 36, 38 and allowed to air dry. The insert is then placed in an oven at 500 degrees F. for 45 minutes. This minimizes absorbed water and organic binders, and provides a relatively uniform coating.

Once this coating process is completed, steel wool is used to locally remove the coating from the tabs. With the coating removed from the tabs, bonding occurs between the cast iron and the steel tabs of the insert.

Figure 1D:
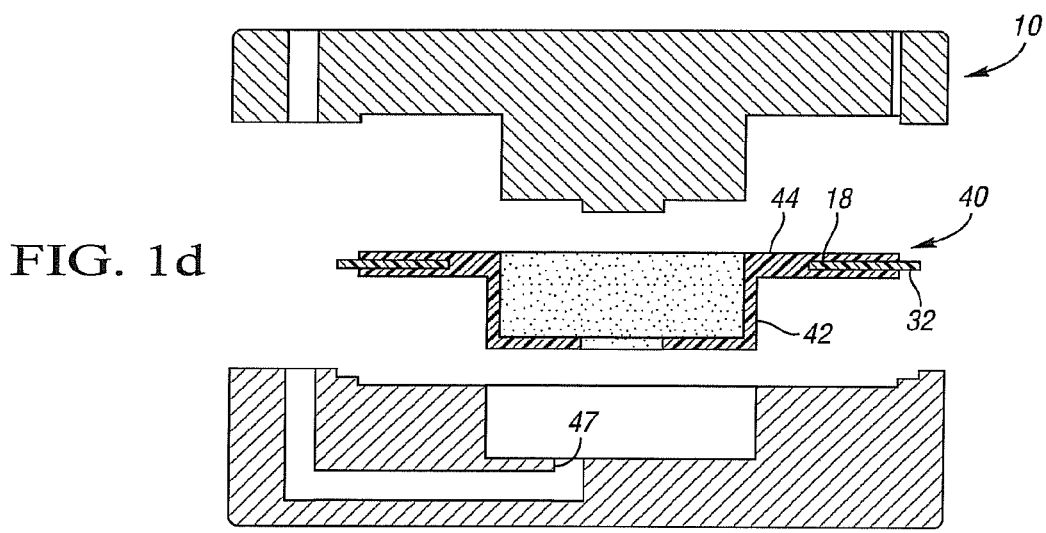
FIG. 1d is a schematic side sectional view of the mold of FIG. 1a, with the mold opened and a friction damped disc brake rotor ejected from the mold in accordance with the invention.

Referring to FIG. 1d, mold 10 is shown in the open position with the final friction damped disk brake rotor 40 removed from the mold cavity. As shown, the friction damped disk brake rotor 40 has a hat portion 42 with a rotor cheek 44 extending about the periphery thereof, and the insert 18 positioned within the cheek 44. The distal end 32 of the tabs 20 of the insert 18 would be machined off after the friction damped disk brake rotor 40 is removed from the mold 10.

The locating tabs can be used on the ID, OD or both positions to stabilize the insert during the metal casting operation. For example, the insert 18 of FIG. 2 has optional internal tabs 56 shown in phantom. The number and placement of tabs depends on the specific rotor geometry and its dimensions, and on the thickness of the steel insert. The tabs 56 and 20 may be used together, or separately.

The steel inserts are preferably 1.5 to 2 mm in thickness, but other thicknesses may be used. The thicknesses are chosen to prevent bending of the insert while not being so thick as to "chill" the surrounding casting to the point that objectionable carbides are produced.

By preventing the steel insert from reacting with the iron during casting, the interfaces are maintained for desired sound damping. By enhancing the bond between the tabs and the cast steel, the gap at the tab areas is eliminated in order to isolate the interfaces from the casting exterior environment to eliminate corrosion issues in service. Also, more than one insert may be cast in place in the rotor.

FIG. 2 also shows in phantom optional through holes 45, which facilitate mold filling while minimizing action of molten metal to move the insert 18. In other words, the holes 45 prevent molten material from lifting up the insert, as the mold is filled from below through the gate channel 47 shown in FIG. 1d. By gating below the part and using a horizontal pouring process, metal is not directed onto or splashed onto the insert prematurely. Also, quiescent mold filling prevents splashing of metal droplets on to the insert prior to general contact with molten metal during mold filling to avoid premature solidification of small droplets of iron.

Also, the molten material is preferably filtered at the gate channel 47, shown in FIG. 1d, with a ceramic filter to reduce slag related defects.

Turning to FIG. 3, an alternative insert 18A is shown, including annular stiffening rib 41 and radial stiffening ribs 43, which are coextensive with the tabs 20. These optional ribs 41, 43 help maintain the position and shape of the insert 18A during mold filling (i.e. prevents "potato-chipping"). The ribs are preferably 0.040 inch thick with a 0.060 inch (1.5 mm) thick insert.

Alternatively, the stiffening rib 41 may be a stiffening ridge 41A as shown in the schematic partial cross-sectional view of insert 18B in FIG. 3a. Referring to FIG. 3b, in a further alternative embodiment, the inside diameter 49 of the annular body of the insert 18A, shown in FIG. 3, may include a turned down flange 41B as shown schematically in the partial cross-sectional view of the insert 18C of FIG. 3b. These various stiffening ribs help maintain the position and shape of the insert 18, 18A, 18B or 18C during mold filling.

FIG. 3 also illustrates relief areas 71, shown in phantom to represent clearance provided in the mold cavity formed in the area of cutout portions and lands 22, 26, 24 and 28 in FIG. 1c. These relief areas 71 in the mold 10 allow the insert to expand without deformation as the molten metal heats it.

The present invention provides reduced disk brake noise and squeal, and limits corrosion of an exposed insert after machining.

It is to be understood that the procedure outlined above can also be used with vented rotor cheek configurations, with a note that an insert or inserts are provided at both or selective one of the rotor cheeks. For example, FIG. 4 shows a mold 60 having upper and lower mold halves 62, 64 forming a mold cavity 66 therebetween for forming a friction damping disc brake rotor with a vented cheek configuration. A pre-manufactured core with a web pattern 68 and insert 70 are supported within the mold cavity 66 and cast over. The core with web pattern 68 forms the venting configuration of the cheek. The insert 70 has tabs 72 supported between cutouts 74 and lands 76. As in the embodiment described with reference to FIG. 1a-d, the tabs 72 are configured to bond to the cast metal, while the body of the insert is coated and does not bond to the cast metal in order to form a proper interfacial boundary for damping. The bonding of the tabs prevents corrosion.

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:

1. A friction damped disc brake rotor, comprising:
at least one rotor cheek having an insert positioned therein, said insert having a generally annular body with a plurality of tabs extending from the body, and wherein a portion of each tab is bonded with the rotor cheek and the body is separated from the rotor cheek by a ceramic coating so that the body provides a proper interfacial boundary with the cheek for damping while the bonding of the tabs with the rotor cheek prevents corrosion-causing exterior elements from reaching the interfacial boundary.

2. The friction damped disc brake rotor of claim 1, wherein said tabs are internal to said body.

3. The friction damped disc brake rotor of claim 1, wherein said tabs are external to said body.

4. The friction damped disc brake rotor of claim 1, wherein said tabs are internal and external to said body.

5. The friction damped disc brake rotor of claim 1, wherein said insert comprises steel.

6. The friction damped disc brake rotor of claim 1, wherein said ceramic coating comprises a mold wash material having alumina and silica particles mixed with an organic binder.

7. The friction damped disc brake rotor of claim 1, wherein said ceramic coating is between approximately 50 and 300 micrometers thick.

8. The friction damped disc brake rotor of claim 1, wherein said insert is between approximately 1.5 and 2.0 mm thick.

9. The friction damped disc brake rotor of claim 1, wherein said insert body is annular and has an upstanding annular stiffening rib thereon.

10. The friction damped disc brake rotor of claim 1, wherein said insert body is annular with tabs extending radially therefrom, and having a plurality of upstanding annular stiffening ribs thereon coextensive with said tabs.

11. The friction damped disc brake rotor of claim 1 wherein said insert body is annular and has a downturned flange along an internal diameter thereof.

12. The friction damped disc brake rotor of claim 1, wherein the at least partial bonding of each tab with the rotor cheek prevents corrosion-causing exterior elements from reaching the interfacial boundary.

13. The friction damped disc brake rotor of claim 1, wherein said coating comprises ceramic.

* * * * *